June 3, 1952     M. V. KIEBERT, JR     2,598,702
SWEEP COMPRESSION FOR USE OF FM RANGE EQUIPMENT
Filed Jan. 19, 1945
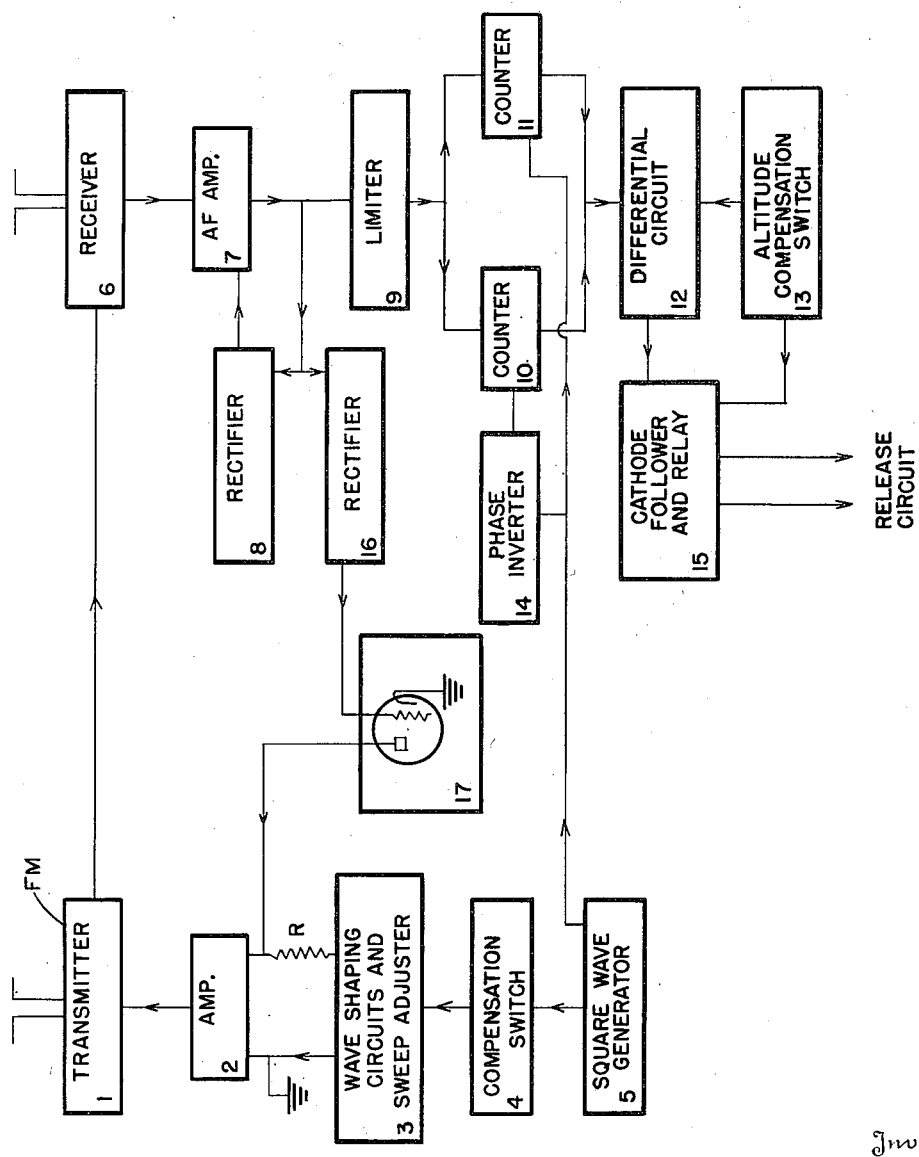
Inventor
MARTIN V. KIEBERT, JR.
By
Attorney Patented June 3, 1952

2,598,702

UNITED STATES PATENT OFFICE 2,598,702

SWEEP COMPRESSION FOR USE OF FM RANGE EQUIPMENT

Martin V. Kiebert, Jr., United States Navy, Arlington, Va.

Application January 19, 1945, Serial No. 573,618

6 Claims. (Cl. 343—7)

(Granted under the act of March 3, 1883, as amended April 30, 1928; 370 O. G. 757)

This invention relates to a radar bomb release device, and is particularly directed to an improvement in such devices.

The primary object is to provide a bomb release device which will operate at various distances from the target.

Other objects and advantages will become apparent from the following specification and claims in connection with the accompanying drawings.

The figure is a block diagram of the system incorporating the invention.

The purpose of the system of this invention is to effect automatically the release of a bomb or other missile from a low flying aircraft directed at an isolated or semi-isolated marine surface vessel. The bomb may be caused to drop at the proper time to hit the surface in the close vicinity of the target, or at a preselected distance ahead of the target. The problem to be solved by the equipment requires that the following conditions be determined and evaluated:

1. Height of the plane above sea level.
2. Horizontal distance to the target.
3. Relative horizontal speed between plane and target.

The plane may be flown at a preselected altitude with the aid of an absolute altimeter, and the equipment be designed for operation at several predetermined altitudes. This will take care of condition 1 above. Condition 2 is indirectly determined by measuring the slant distance from the plane to the target by frequency modulation radar equipment. An antenna array is used to beam the high frequency waves forward but sufficiently downward to be reflected back from surface vessels. Thus, the time required for the signal to travel from the plane to the target and back again, and hence the distance may be evaluated. Condition 3 is evaluated in terms of slant relative speed between the plane and target by utilizing the Doppler effect produced by the rapid approach of the plane.

Since this equipment is designed for use at low altitude, it is assumed that the time of fall of a projectile is the same as that of a projectile in free space, and air resistance is neglected. It is also assumed that the forward velocity of the projectile is maintained constant up to the point of impact.

The system has been designed to automatically account for the above conditions for each of a number of preset altitudes by a compensation switch. Since each altitude requires a different slope, or time factor, as determined by curves of the falling bomb; the equipment has been designed to give this required slope by an appropriate control of the bandwidth swept by the transmitter 1. Hence, the bandwidth is a predetermined function of the time of drop plus the delay due to mechanical and electrical inertia.

As in frequency modulated altimeters, the beat frequency output of the detector will be proportional, among other factors, to the frequency band swept by the transmitter. The frequency modulated signal is transmitted to and reflected back from the target. The instantaneous frequency of the reflected signal lags the instantaneous frequency of the transmitted signal by $$\frac{2D}{C}$$

seconds where D is the distance from the transmitter to the target in feet, and C is the speed of light in feet per second. Since a portion of the energy of the transmitter is fed directly into the detector, the transmitter signal and the reflected signal will heterodyne in the detector to produce a resultant low frequency beat note whose frequency will be proportional to the distance to the target. The number of cycles per second per foot of distance to the target may be varied directly by varying the sweep width. This is readily done by varying the driving voltage to the modulator.

Since the distance from the target at which the missile must be released is dependent upon the forward speed of the aircraft relative to the target, as well as the altitude, it is necessary that this speed be evaluated by the equipment. Use is made, therefore, of the Doppler effect caused by the approach of the plane toward the target.

Due to this effect when the transmitted and received signals are mixed in the detector 6, two audio frequencies will occur, one during the increase in frequency, or upsweep, or the wave and the other during the decrease, or downsweep. These frequencies are composed of both distance and speed factors, and the upsweep is the difference, and the downsweep the sum, of the distance and speed variables. The equipment constantly measures these two variables in terms of the preset altitude; and when they bear the proper relation, the bomb release is actuated.

The transmitter 1 consists of ultra high frequency equipment, frequency modulated by a mechanically vibrating condenser. This modulator is operated by a square wave generator 5 the output of which is fed thru wave shaping circuits and sweep adjusting means 3 and amplifier 2 whose functions are to produce linear frequency modulation of the transmitter 1. A compensation switch 4 is provided at the output of square wave generator 5 for changing the sweep width of the transmitter 1 proportional to the time of free fall of a bomb and compensate for distance intercept. A portion of the signal from the transmitter is fed to the receiver 6 to beat with the reflected signals. The low frequency beats resulting therefrom are amplified at amplifier 7 and converted into square waves by passing thru a limiter circuit 9. The square wave is then applied to a differential counter circuit 10, 11, and 12 which is employed to derive a voltage which is proportional to frequency. It is highly desirable that the output voltage of the counter circuit 10, 11, and 12 be linear with respect to input frequency. Two counters are set up and arranged so that one operates only during the upsweep in frequency and the other operates during the downsweep. This is done by application of control voltages from the square wave generator 5 directly to counter 11 and after phase inversion by means of phase inverter 14, to counter 10, which renders the counters separately operable at the proper time and synchronizes them with the sweep circuit 3 of the transmitter 1.

Each counter develops voltages responsive to speed and distance, and these voltages are added algebraically, and applied to the control tube 15 to operate the relay connected thereto. When a predetermined value is reached, this relay will be actuated to close its release circuit.

In order to obtain the maximum range and provide proper operation of such a frequency modulation ranging equipment, the audio amplifier 7 is peaked at a frequency variable in the neighborhood of about 5000 cycles. By the provision of a rectifier 8 which automatically decreases the high frequency response of the amplifier 7 as a function of received signal strength, this peak is made lower for higher amplitudes of signal, and vice versa.

It is obvious that the amount of the variation of this peak is limited; and that, as the distance from the target is increased, a point will be reached at which the heterodyne beat in the receiver will exceed the peak of the amplifier.

The present invention has as its purpose the elimination of this difficulty.

This is accomplished by reducing the sweep of the frequency modulation waves, and by providing an automatic control therefor. Reducing the sweep has the effect of reducing the frequencies of the beats in the receiver amplifier circuit 7, and thereby keeping these beats within the range of maximum amplification of the amplifier 7.

The figure shows the present invention at 16 and 17.

A portion of the audio frequency beats in the receiver 6 are rectified and filtered by rectifier 16 and applied as a bias to a control tube 17. This tube in turn is used to control the sweep circuits automatically in response to the amplitude of the beats. If a mechanical frequency modulator is employed, the plate impedance of the tube at 17 in conjunction with R will act as an attenuator and thus may vary the voltage applied thereto; or the tube may be used to control an intermediary circuit for varying the amount of sweep.

If a reactance tube frequency modulator is used, the tube 17 may also act as a variable attenuation network with the plate circuit thereof serving to limit the sweep. Any other of the known methods of control may be substituted.

Tube 17 is biased to provide proper control and, if desired, a delay bias may be applied. The tube may be cut off at a desired proximity of the target.

The sweep of the frequency modulated wave should be limited to the point where the threshold distance from the target will provide response essentially at the peak of the curve of the audio amplifier 7.

In operation increasing signal amplitudes result in increasing bias from rectifier 16, which is applied to tube 17. This effectively expands the sweep of the frequency modulated signals as the equipment moves nearer to the target.

It is obvious that the rectifier 16 may be arranged to produce either a negative or positive bias, and that the bias may either increase or decrease with increasing signal amplitude, depending on the particular arrangement of tube 17 in its circuit.

While the invention has been described in conjunction with specific arrangements of components, it should be expressly understood that various changes and substitutions may be made without departing from the spirit of the invention as defined in the appended claims.

The invention described herein may be manufactured and used by or for the Government of the United States of America for governmental purposes without the payment of any royalties thereon or therefor.

What is claimed is:

1. In a radiant energy ranging system, means for transmitting frequency modulated waves to an object, said means including a sweep generator, wave shaping circuits operatively connected to said sweep generator and energized therefrom, the output signal from said wave shaping circuits having a magnitude proportional to the frequency sweep width, an amplifier, and connections between the input of said amplifier and said wave shaping circuits, one of said connections including a resistor; means for receiving said waves directly from said transmitting means and for receiving said waves after reflection from the object; means for combining the received waves to produce a beat frequency signal; means for rectifying at least a portion of said beat frequency signal; and means for applying said rectified portion across said resistor to vary the magnitude of the output signal from said wave shaping circuits.

2. In a radiant energy ranging system, means for transmitting frequency modulated waves to an object, said means including a sweep generator, wave shaping circuits operatively connected to said sweep generator and energized therefrom, an amplifier, and connections between the input of said amplifier and said wave shaping circuits, one of said connections including a resistor, another of said connections being at ground potential; means for receiving said waves directly from said transmitting means and for receiving said waves after reflection from the object; means for combining the received waves to produce a beat frequency signal; means for rectifying at least a portion of said beat frequency signal; and an electron discharge tube having an anode, grid, and cathode, said anode being connected to said resistor on the amplifier side thereof, said cathode being connected to ground, said grid being connected to said rectifying means to receive a signal therefrom; said electron discharge tube, resistor, and connections providing an arrangement whereby the frequency sweep of said modulated waves is varied in response to changes in said beat frequency signal.

3. In a radiant energy ranging system, means for transmitting frequency modulated waves to an object, said means including a sweep generator, wave shaping circuits operatively connected to said sweep generator and energized therefrom, an amplifier, connections between the input of said amplifier and said wave shaping circuits, one of said connections including a resistor, another of said connections being at ground potential, and R.-F. oscillator means connected to said amplifier and adapted to generate a frequency modulated signal having a sweep width controlled by the amplitude of the output of said amplifier; means for receiving said waves directly from said transmitting means and for receiving said waves after reflection from the object; means for combining the received waves to produce a beat frequency signal; means for rectifying at least a portion of said beat frequency signal; and an electron discharge tube having an anode, grid, and cathode, said anode being connected to said resistor on the amplifier side thereof, said cathode being connected to ground, said grid being connected to said rectifying means to receive a signal therefrom, said electron discharge tube, resistor, and connections providing an arrangement whereby the frequency sweep of said modulated waves is varied in response to changes in said beat frequency signal.

4. In a bomb release system, means for transmitting frequency modulated waves to an object, said means including a sweep generator, wave shaping circuits operatively connected to said sweep generator and energized therefrom, the output signal from said wave shaping circuits having a magnitude proportional to the frequency sweep width, an amplifier, and connections between the input of said amplifier and said wave shaping circuits, one of said connections including a resistor; means for receiving said waves directly and after reflection from the target and for producing a beat signal therefrom; differential counter means for producing a potential proportional to the beat signal; a control mechanism responsive to the potential, said mechanism being adapted to actuate the bomb release; a rectifier for deriving an additional potential having an amplitude proportional to the frequency of the beat signal; and means for applying said additional potential across said resistor to vary the magnitude of the output signal from said wave shaping circuits.

5. In a bomb release system, means for transmitting frequency modulated waves to an object, said means including a sweep generator, wave shaping circuits operatively connected to said sweep generator and energized therefrom, an amplifier, and connections between the input of said amplifier and said wave shaping circuits, one of said connections including a resistor, another of said connections being at ground potential; means for receiving said waves directly and after reflection from the target and for producing a beat signal therefrom; differential counter means for producing a potential proportional to the beat signal; a control mechanism responsive to the potential, said mechanism being adapted to actuate the bomb release; a rectifier for deriving an additional potential having an amplitude proportional to the frequency of the beat signal; and an electron discharge tube having an anode, grid, and cathode, said anode being connected to said resistor on the amplifier side thereof, said cathode being connected to ground, said grid being connected to said rectifier and having said additional potential applied thereto, said electron discharge tube, resistor, and connections providing an arrangement whereby the frequency sweep of said modulated waves is varied in response to changes in said beat frequency signal.

6. In a bomb release system, means for transmitting frequency modulated waves to an object, said means including a sweep generator, wave shaping circuits operatively connected to said sweep generator and energized therefrom, an amplifier, connections between the input of said amplifier and said wave shaping circuits, one of said connections including a resistor, another of said connections being at ground potential, and R.-F. oscillator means connected to said amplifier and adapted to generate a frequency modulated signal having a sweep width controlled by the amplitude of the output of said amplifier; means for receiving said waves directly and after reflection from the target and for producing a beat signal therefrom; differential counter means for producing a potential proportional to the beat signal; a control mechanism responsive to the potential, said mechanism being adapted to actuate a bomb release; a rectifier for deriving an additional potential having an amplitude proportional to the frequency of the beat signal; and an electron discharge tube having an anode, grid, and cathode, said anode being connected to said resistor on the amplifier side thereof, said cathode being connected to ground, said grid being connected to said rectifier and having said additional potential applied thereto, said electron discharge tube, resistor, and connections providing an arrangement whereby the frequency sweep of said modulated waves is varied in response to changes in said beat frequency signal.

MARTIN V. KIEBERT, Jr.

REFERENCES CITED

The following references are of record in the file of this patent:

UNITED STATES PATENTS

| Number | Name | Date |
| --- | --- | --- |
| 2,249,181 | Shepard | July 15, 1941 |
| 2,257,830 | Wolff | Oct. 7, 1941 |
| 2,268,643 | Crosby | Jan. 6, 1942 |
| 2,321,269 | Artzt | June 8, 1943 |
| 2,407,644 | Benioff | Sept. 17, 1946 |
| 2,412,632 | Sanders | Dec. 17, 1946 |
| 2,421,394 | Schelleng | June 3, 1947 |
| 2,436,834 | Stodola | Mar. 2, 1948 |